(12) United States Patent (10) Patent No.: US 7,002,600 B2
Okada et al. (45) Date of Patent: Feb. 21, 2006

(54) IMAGE CUT-AWAY/DISPLAY SYSTEM

(75) Inventors: Hiroshi Okada, Tokyo-To (JP);
Takeshi Takatsuka, Tokyo-To (JP);
Shuichi Yokokura, Tokyo-To (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 48 days.

(21) Appl. No.: 09/870,690

(22) Filed: Jun. 1, 2001

(65) Prior Publication Data

US 2002/0015047 A1 Feb. 7, 2002

(30) Foreign Application Priority Data

Jun. 2, 2000 (JP) ............................. 2000-166364

(51) Int. Cl.
*G09G 5/00* (2006.01)
(52) U.S. Cl. ........................ 345/625; 345/620; 345/623

(58) Field of Classification Search ................ 345/620, 345/623, 625
See application file for complete search history.

(56) References Cited

U.S. PATENT DOCUMENTS 6,239,771 B1 * 5/2001 Usuki et al. .................... 345/8

* cited by examiner

*Primary Examiner*—Matthew C. Bella
*Assistant Examiner*—Tam Tran
(74) *Attorney, Agent, or Firm*—Smith, Gambrell & Russell

(57) ABSTRACT

An image cut-away/display system is disclosed. Images are taken in continuous view areas by several cameras, etc. The images are combined for forming a single wide-area view image. View-point data is generated for each of users. Images are cut away for each user from the single wide-area view image based on the view-point data for each user. The cut-away images are displayed on a head-mount display for each user at a view point of each user.

3 Claims, 4 Drawing Sheets

IMAGE CUT-AWAY/DISPLAY SYSTEM

BACKGROUND OF THE INVENTION

The present invention relates to an image cut-way/display system for cutting away and displaying images required for a user from a wide-area view image.

There is a demand for outside view data based on outside wide-area view images taken by a camera, etc.

Such outside view data is helpful for vehicle crews because outside views are very limited or completely invisible duet to the positions of crew members except a pilot (or driver) and a copilot on a vehicle such as an automobile, a train and an aircraft.

Such outside data is helpful for vehicle crews because outside views are very limited or completely invisible due to the positions of crew members except a pilot (or driver) and a copilot on a vehicle such as an automobile, a train and an aircraft.

Outside view data is obtained by converting outside wide-area ring-like original images taken by a single camera with a movable mirror into images with no deformation and cutting away and displaying a part of the converted images. Or, such data are obtained by taking outside wide-area original images by a single camera with a fisheye lens, cutting away images at selected view points and distributing the images to a plurality of users on screen via a network.

It is, however, difficult for distributing those images in real time to users according to need. Moreover, cutting away a part of wide-area images taken by a single camera results in decrease in resolution of cut-away images, thus causing difficulty in providing high-quality images to users.

SUMMARY OF THE INVENTION

A purpose of the present invention is to provide an image cut-away/display system that timely offers a plurality of users with high-quality images at potions according to need from a single wide-area view image.

The present invention provides an image cut-away/display system comprising: a plurality of image taking means for taking images in continuous view areas; image combining means for combining the images taken by the image taking means to form a single wide-area view image; view-point data generating means for generating view-point data for each of users; image cut-away means for cutting away images for each user from the single wide-area view image based on the view-point data for each user; and image displaying means for displaying the cut-away images for each user at a view point of each user.

DETAILED DESCRIPTION OF PREFERRED EMBODIMENTS

Preferred embodiments according to the present invention will be disclosed with reference to the attached drawings.

Figure 1:
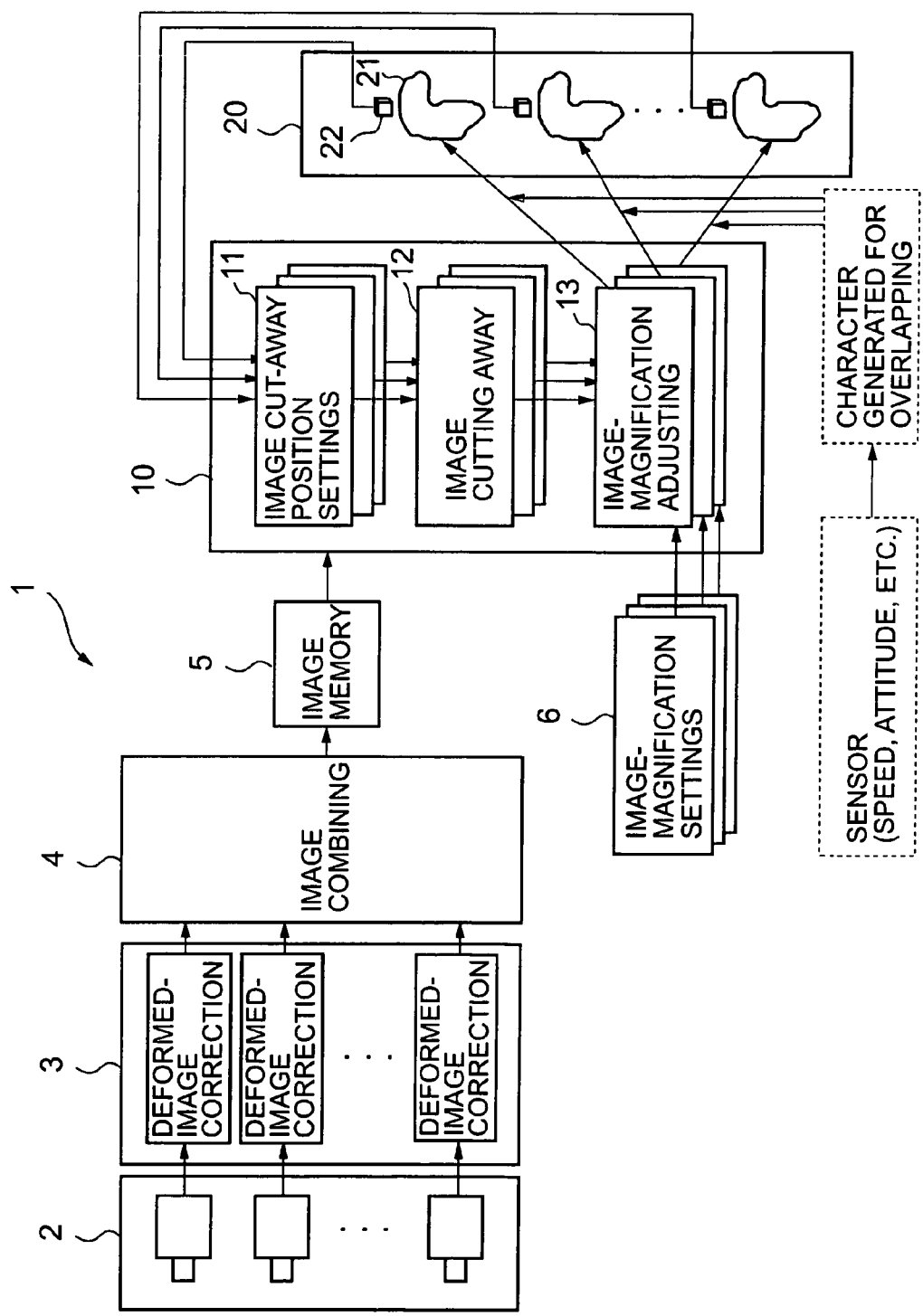
FIG. 1 shows a block diagram of an image cut-away/display system according to the present invention.

FIG. 1 shows a block diagram of an image cut-away/display system 1 according to the present invention.

The image cut-away/display system 1 cuts away images from a single wide-area image of high resolution at positions selected by users according to need and immediately distributing the cut-away images of high quality to the users.

The system 1 is installed in a relatively small aircraft such as a helicopter, equipped with several image taking means such as a visible-light camera, an infrared camera, a milli-meter wave camera, a laser radar and milli-meter wave radar. A wide-area image of high resolution is generated by combining a plurality of images of sequential view areas taken by these image taking means.

In detail, the image cut-away/display system 1 is provided with a plurality of cameras 2 as a means of taking images of sequential view areas, a deformed-image correcting apparatus 3 for correcting deformation of images taken by the cameras 2, an image combining apparatus 4 for combining the images to generate a single wide-area view image, an image memory 5 for storing the image generated by the image combining apparatus 4, an image cut-away apparatus 10 for cutting away images at positions required for each of crew members from the stored single wide-area view image, and a display apparatus 20 having a head-mount display (HMD) 21 mounted on each crew member's helmet for displaying images at crew member's view point and a head-motion tracker 22 attached to the HMD 21 for detecting and outputting the lateral and vertical positions of each crew member's head as point of view data.

The HMD 21 is a display having a transparent-type display such as a transparent-type liquid-crystal display by which actual views can been seen through images from the image cut-away apparatus 10. The point of view data for each of crew members may be obtained by a detector that detects motion of eyeballs of each of crew members instead of the head-motion tracker 22.

The image cut-away apparatus 10 is provided with an image cut-away position setting section 11 for setting an image cut-away position for each of crew members on the single wide-area view image based on the viewing point data from the head-motion tracker 22 of each of crew members, an image cut-away section 12 for cutting away images based on the image cut-away position set by the setting section 11 for displaying the cut-away images to each of crew members, and an image-magnification adjusting section 13 for adjusting magnification of each cut-away image in response to a signal from an image-magnification setting section 6.

Figure 2:
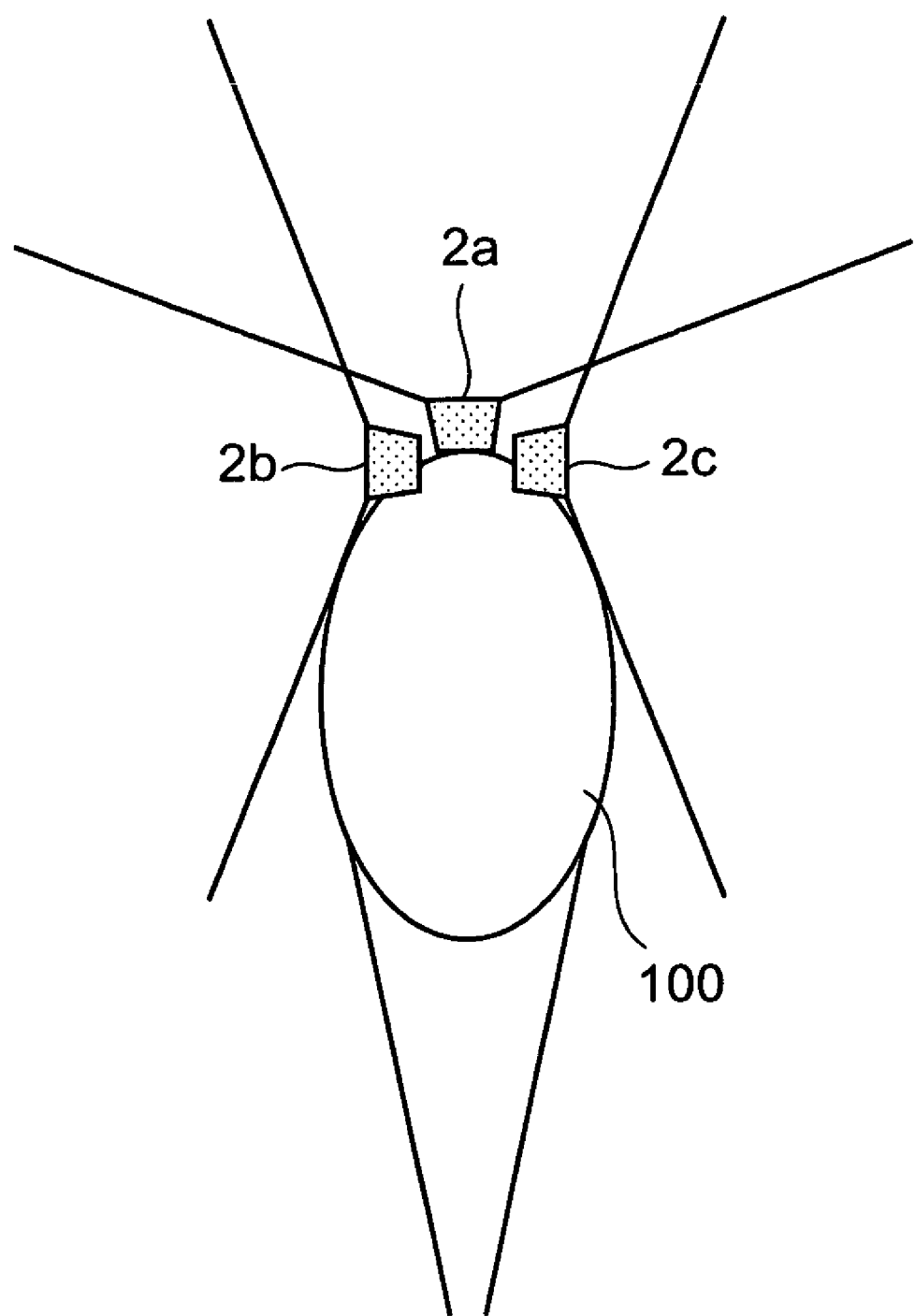
FIG. 2 illustrates camera arrangement according to the present invention.

FIG. 2 illustrates a front camera 2a, a left camera 2b and a right camera 2c, totally three cameras installed in a helicopter 100.

These three cameras are arranged so that optical axes of the cameras 2a, 2b and 2c cross each other on a point in relation to the center of a cockpit, etc.

Image-taking zones for the cameras 2a, 2b and 2c are a front view, a left view and a right view, respectively, continuous to and overlapping with each other around the helicopter 100.

Images taken by the several cameras 2 are corrected for deformation by the deformed-image correcting apparatus 3 and sent to the image combining apparatus 4 to generate a single wide-area view image.

The single wide-area view image is of a high resolution as almost three times higher when taken by the three cameras 2a, 2b and 2c than that for a wide-area view image taken by a single camera with a fisheye lens or movable mirror if the three cameras and the single camera have the same resolution.

The image cut-away/display system 1 according to the present invention thus immediately offers each of crew members with high-quality images by cutting away at positions required for each of crew members from a single wide-area view image of high resolution.

Figure 3:
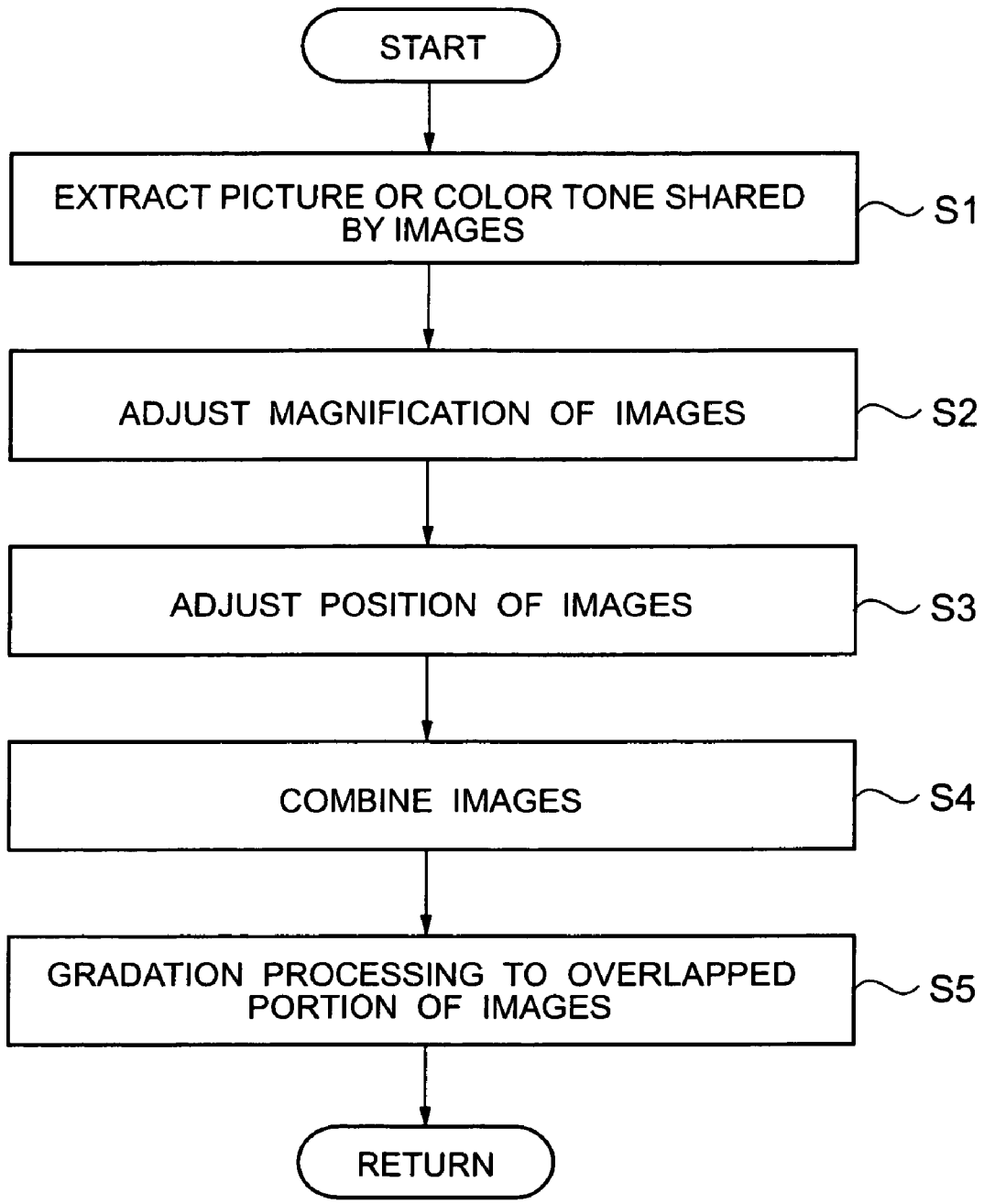
FIG. 3 shows a flow chart indicating image combining processing according to the present invention.

FIG. 3 is a flowchart indicating an image combining processing performed by the image combining apparatus 4.

In step S1, a picture or color tone shared by two images to be combined is extracted for recognizing an overlapped portion of the images. Next, in steps S2 and S3, each image is adjusted for magnification and position as a pre-processing to the image combination for correcting differences in size or position of an object, which have occurred due to variation in focal length or angle of view of each camera. The overlapped portions of the two images are combined to one image in step S4. The overlapped portions are adjusted by gradation processing, etc., in step S5, to form a natural image with almost no visible joints between the two images.

The foregoing image combination is performed such that, to an image taken by a first reference camera, an image taken by the next camera is combined when "n" pieces of images taken by "n" cameras (2) are combined. An image of the further next camera is then combined with the combined image, which is repeated for (n−1) times. One wide-area view image of high resolution is thus formed from the "n" pieces of images and stored in the image memory 5.

The wide-area view image stored in the memory 5 is sent to the image cut-away apparatus 10.

The view-point data from the head-motion tracker 22 of each of crew members is converted onto the coordinate of the image sent from the memory 5 by the image cut-away position setting section 11 for setting an image cut-away position for each of crew members.

An image is cut away from the wide-area view image at the set position in size set in accordance with the display performance of each HMD 21.

The cut-away image is sent to the image-magnification adjusting section 13 for magnification adjustment.

The magnification-adjusted image is sent to the HMDs 21 and displayed in directions required for each of crew members.

Each of crew members can see actual views through the displayed image via the HMD 21. The display screen in the HMD 21 will not be dark even if each of crew members turns onto another position distant from the wide-area view image formed by combination of images from the several cameras 2, thus securing views for the crew members.

For an aircraft such as a helicopter, as indicated by dotted blocks in FIG. 1, character data may generated based on speed, altitude, position, attitude and so on from sensors and displayed on the HMD 21 as overlapped with the image.

Figure 4:
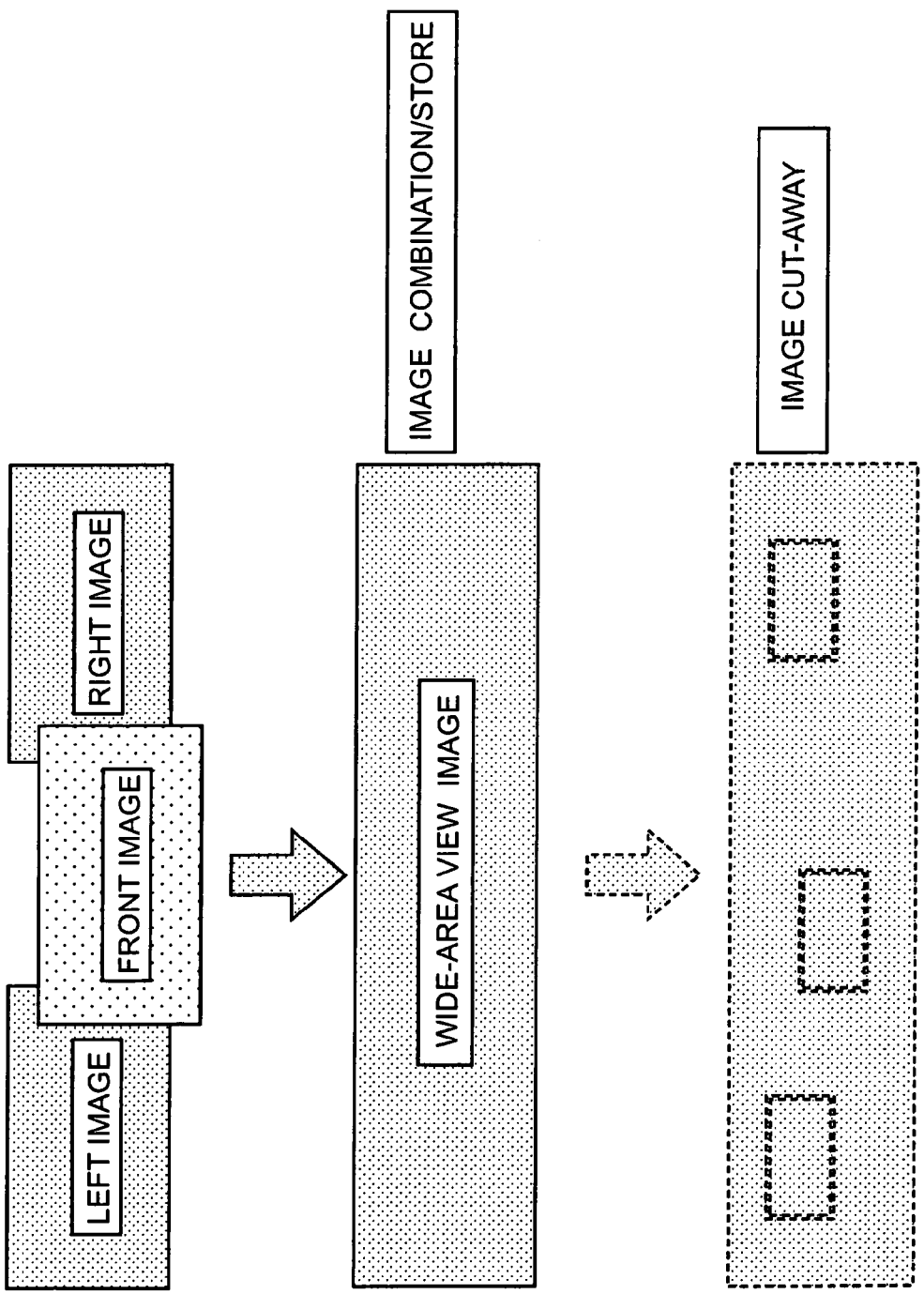
FIG. 4 illustrates processing from combination of images to image cut-away.

FIG. 4 illustrates the foregoing processing from generation of a wide-area view image of high resolution by combination of left, front and right imaged from the three cameras 2a, 2b and 2c, respectively, to image-cutting away at positions for crew members.

Each of crew members can watch an image in any direction immediately and separately. A wide-area view image as the source of image to be cut away for each of crew members in this invention has resolution higher than that of a wide-area image taken by a single camera, thus images cut away from this wide-area view image will suffer from less decrease in resolution to be displayed for each of crew members.

The present invention offers high quality images in real time at any position to crew members of for example, a helicopter in searching for someone in a wide area, thus enabling quick and sure searching. The present invention does not require one camera for each of crew members for providing high quality images to each of crew members, thus offering a compact and light image cut-away/display system.

As disclosed, the present invention quickly provides high quality images to each of users from one wide-area view image at any position according to need.

It is further understood by those skilled in the art that the foregoing description is a preferred embodiment of the disclosed device and that various change and modification may be made in the invention without departing from the spirit and scope thereof.

What is claimed is:

1. An image cut-away and display method, comprising the steps of:
    taking continuous pictures of a wide range of surroundings without a rift with a plurality of cameras; namely, a front camera, a left camera and a right camera mounted on a vehicle, optical axes of the cameras crossing each other on a given point in the vehicle;
    rectifying a deformation of each picture by a correcting apparatus;
    preparing image combining means electronically and optically connected to said plurality of cameras;
    making a series of continuous images of said surroundings by combing said pictures;
    identifying said images required for displaying;
    extracting a common image related to each picture or a common color tone thereof from said picture;
    correcting a magnifying ratio of said image;
    generating a view-point information for a crew member by view-point information generating means included in said display apparatus;
    adjusting a position of said image;
    forming a connected image by connecting an overlapped portion of said image; and
    processing said image by a gradation method so as to smoothly and continuously connect said image without an outstanding overlapped portion thereof.

2. The image cut-away and display method according to claim 1, wherein said view-point-information generating step includes the step of tracking motion of a head of said crew member.

3. An image taking-out and displaying system for taking images of objects in continuous wide range around a vehicle by a plurality of cameras provided in said vehicle for assisting human eyes of an operator of said vehicle and for displaying said images in front of eyes of said operator, comprising:
    image correction means electro-optically connected to said cameras for correcting irregularities of said images;
    image combining means electro-optically connected to said image correction means for combining said images to a single wide area view image;
    memory means electro-optically connected to said image combining means for storing data of said image;
    viewpoint-information data outputting means for generating viewpoint-information data of said operator on the basis of motion of the eyes of said operator,
    image editing means electro-optically connected to said memory means and said viewpoint-information data outputting means for taking out necessary images for each operator from said single wide area view image based on said viewpoint-information data and for displaying said images for each operator as required so as to promptly and exactly present said images with a high quality at an adequately required position.

* * * * *